(12) United States Patent
Castro

(10) Patent No.: US 10,118,086 B2
(45) Date of Patent: Nov. 6, 2018

(54) STRATEGIC GAME HAVING COLLECTABLE AND TRADABLE ELEMENTS

(71) Applicant: Curtis Castro, Los Angeles, CA (US)

(72) Inventor: Curtis Castro, Los Angeles, CA (US)

( * ) Notice: Subject to any disclaimer, the term of this patent is extended or adjusted under 35 U.S.C. 154(b) by 319 days.

(21) Appl. No.: 14/960,019

(22) Filed: Dec. 4, 2015

(65) Prior Publication Data

US 2017/0157500 A1   Jun. 8, 2017

(51) Int. Cl.
*A63F 3/00* (2006.01)
*A63F 1/04* (2006.01)
*A63F 13/80* (2014.01)

(52) U.S. Cl.
CPC ............ *A63F 3/00075* (2013.01); *A63F 1/04* (2013.01); *A63F 3/00697* (2013.01); *A63F 3/00895* (2013.01); *A63F 13/80* (2014.09); A63F 2001/0408 (2013.01); A63F 2001/0441 (2013.01); A63F 2003/0076 (2013.01); A63F 2003/00826 (2013.01); A63F 2003/00917 (2013.01); A63F 2003/00996 (2013.01)

(58) Field of Classification Search
None
See application file for complete search history.

(56) References Cited

U.S. PATENT DOCUMENTS

| | | | | |
|---|---|---|---|---|
| 3,998,463 A | * | 12/1976 | Zumchak | A63F 3/00075 273/262 |
| 4,477,080 A | * | 10/1984 | Baker | A63F 3/00006 273/241 |
| 5,251,905 A | * | 10/1993 | Bombino | A63F 3/00075 273/255 |
| 5,351,965 A | * | 10/1994 | Telfer | A63F 3/02 273/260 |
| 5,407,204 A | * | 4/1995 | Meyer, III | A63F 3/00031 273/148 A |
| 5,709,384 A | * | 1/1998 | Miller | A63F 3/00006 273/244.2 |
| 6,050,567 A | * | 4/2000 | Zucco | A63F 3/00006 273/246 |
| 6,575,463 B1 | * | 6/2003 | Wintersteen | A63F 3/00075 273/236 |
| 8,328,196 B1 | * | 12/2012 | Kihslinger | A63F 3/00 273/243 |

(Continued)

*Primary Examiner* — Sunit Pandya
(74) *Attorney, Agent, or Firm* — Omni Legal Group; Omid E. Khalifeh

(57) ABSTRACT

A game and method of play are provided herein. In an embodiment, a playing field is provided as a board marked with spaces. A plurality of visually different groups of pieces are provided, one group each corresponding to one player, and are placed in a prescribed pattern so that each player begins the game with an equal opportunity to win. A pool of prompts selectably instructing progression of game play is also provided. Each player may construct his own set of prompts from the pool. Then, executing turns in sequence, each player may invoke prompts from his own set against opposing players, causing pieces to be removed from the playing field until only one, indicating the winner, remains. The prompts may be printed on stylized playing cards which may be collectable and/or tradable, so that players may continue to customize sets of prompts available to invoke over time.

6 Claims, 10 Drawing Sheets

(56) References Cited

U.S. PATENT DOCUMENTS

| | | | | |
|---|---|---|---|---|
| 9,028,314 B2 * | 5/2015 | Hawthorne | ............... | A63F 3/02 463/10 |
| 2002/0153658 A1 * | 10/2002 | Padgett | ............... | A63F 3/00028 273/244 |
| 2007/0057459 A1 * | 3/2007 | Silva | ......... | A63F 1/00 273/255 |
| 2009/0302538 A1 * | 12/2009 | Futrell, III | .......... | A63F 3/00063 273/241 |
| 2010/0072702 A1 * | 3/2010 | Fowler | ...................... | A63F 3/02 273/236 |

* cited by examiner

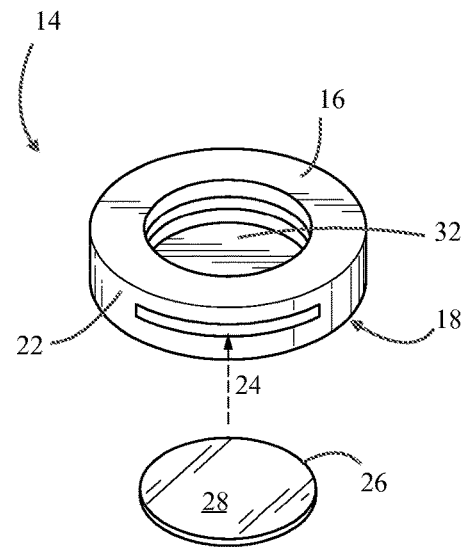
*FIG. 2A*
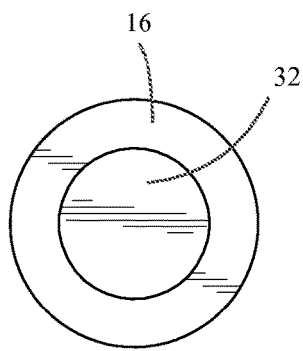
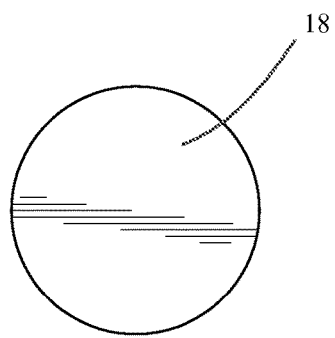
*FIG. 2B*　　　　*FIG. 2C*

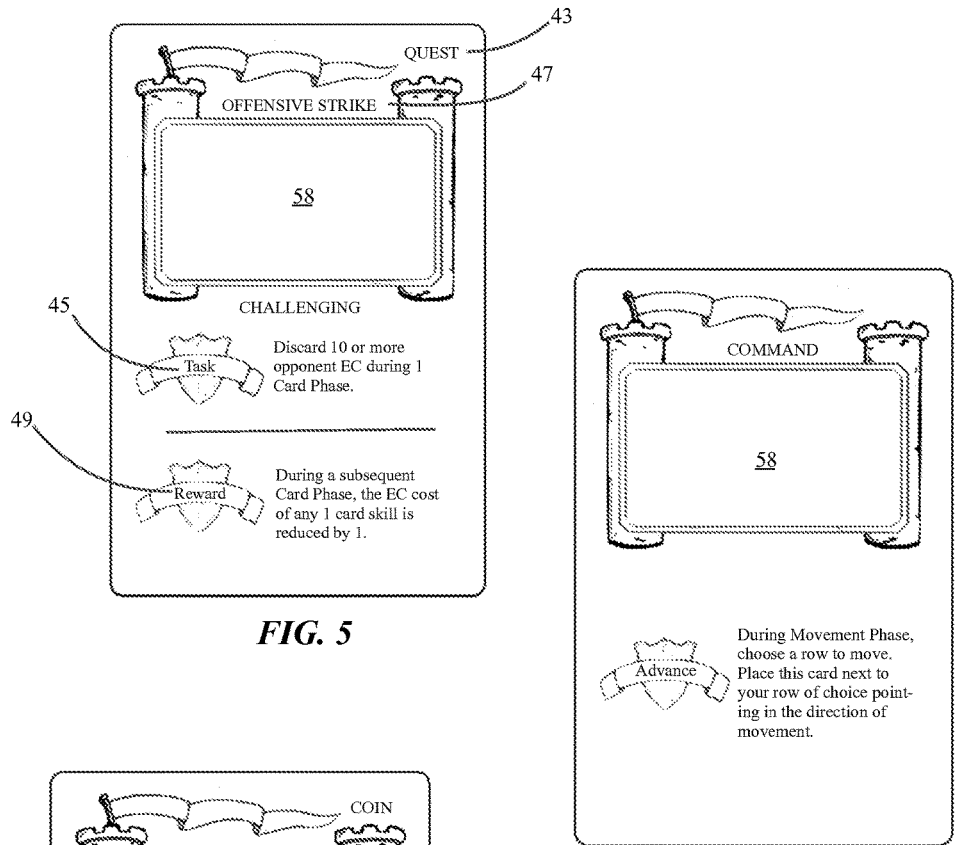
FIG. 5
FIG. 6
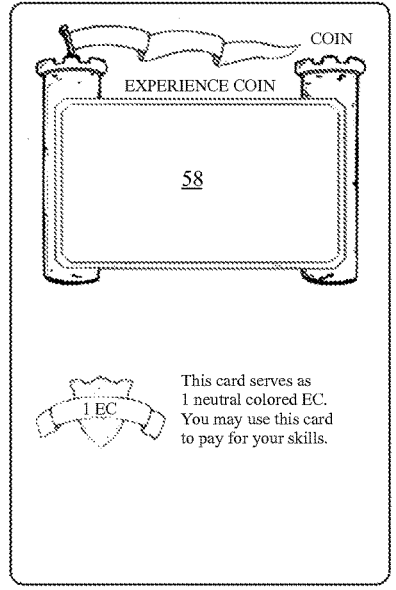
FIG. 7

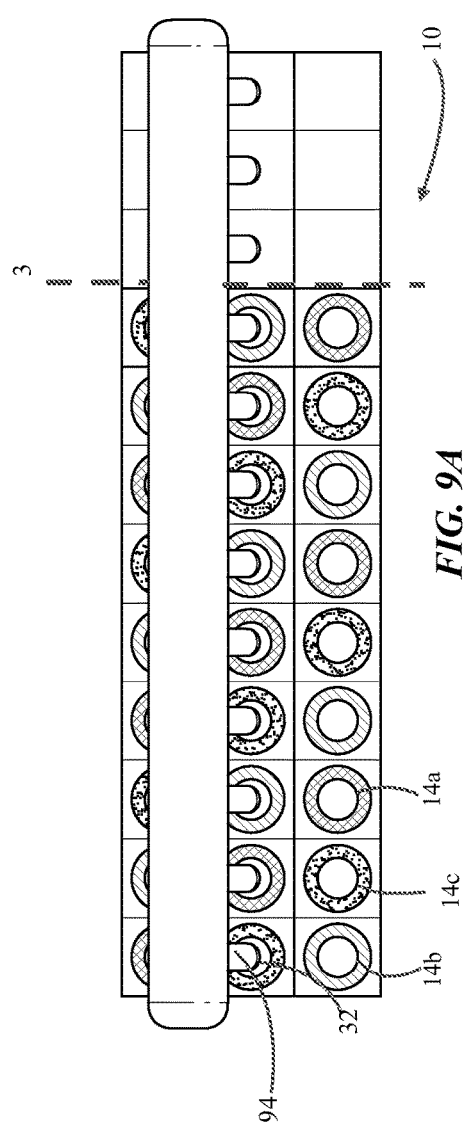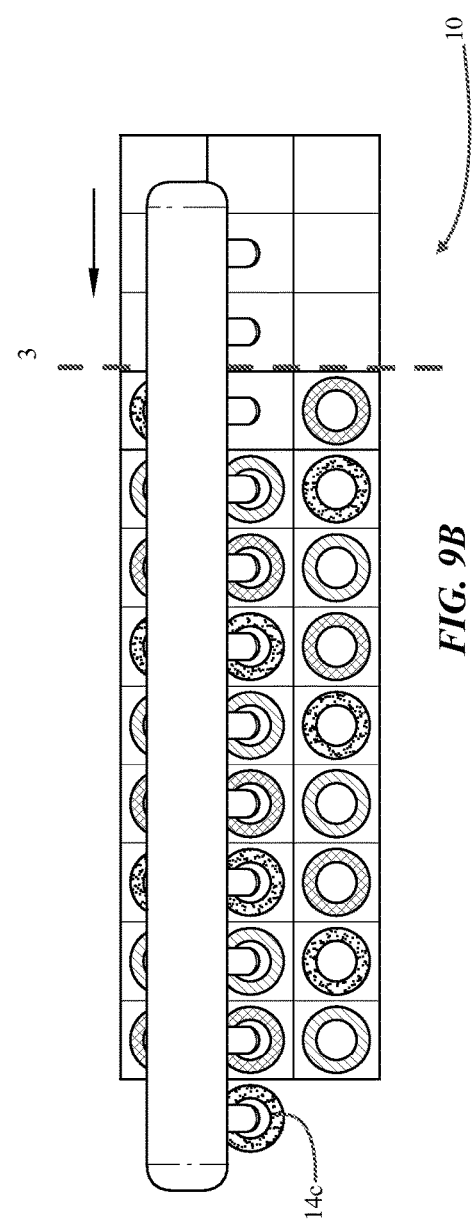

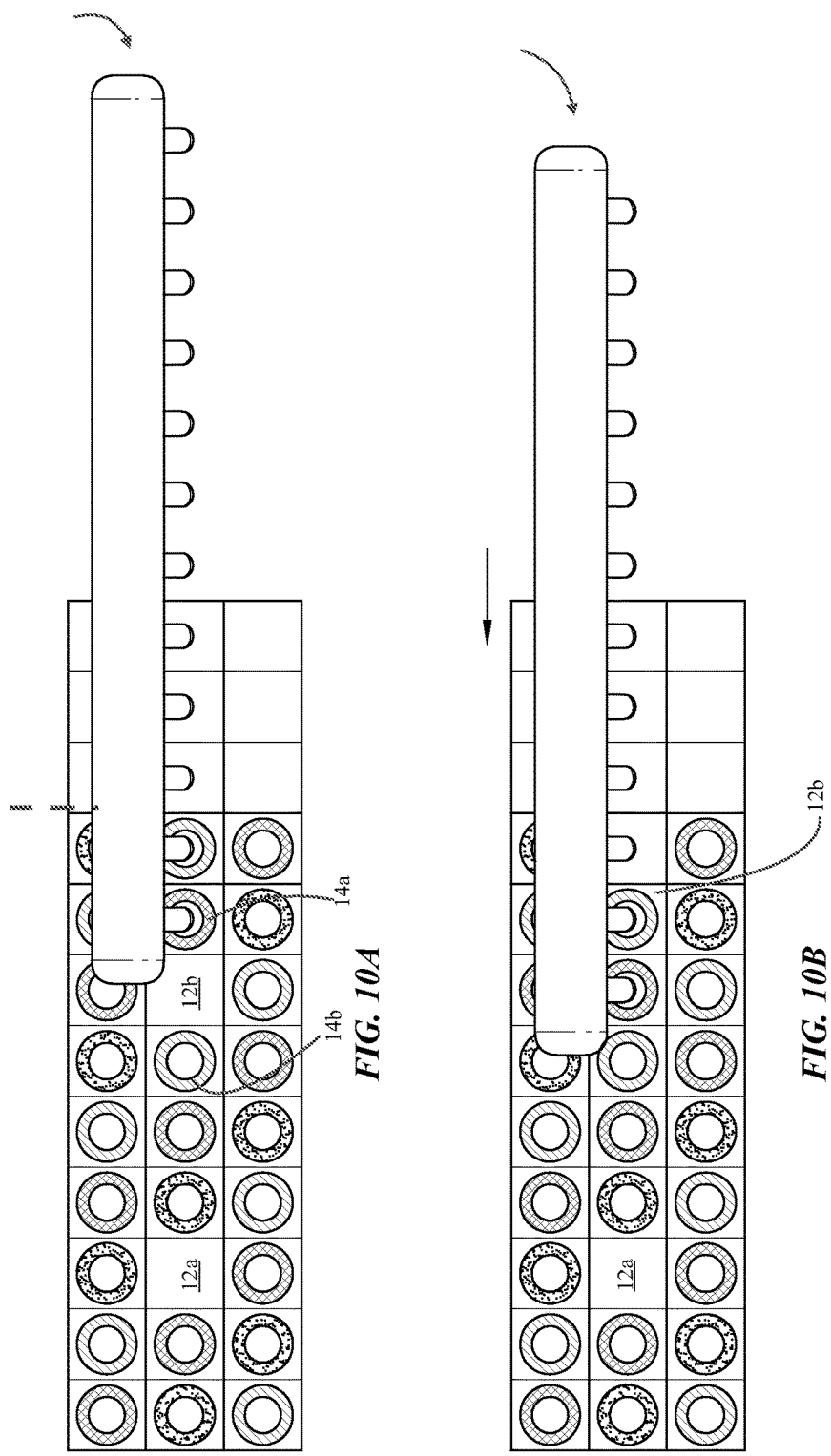

STRATEGIC GAME HAVING COLLECTABLE AND TRADABLE ELEMENTS

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material that is subject to copyright protection. This patent document may show and/or describe matter that is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to recreational games and, more particularly, to trading cards and board games, and even further to apparatuses and methods of strategic game play simulating military conquest.

BACKGROUND

Various recreational games are known to employ elements of chance and elements of strategy to determine a winner from among playing members. Indeed, such games involving specialized cards that can be collected and traded are increasingly popular.

Some of these are playable with collectable trading cards alone. For example, U.S. Pat. No. 5,662,332 to Garfield teaches a trading card game comprising spell or command cards which enable players to "attack, defend, and modify" the effects of other players' moves. Players create their own library of collectable cards and then play with a randomized hand drawn at predetermined intervals from that library. This adds an element of chance to an otherwise strategic game, ensuring that the progression of game play depends in part on the occurrence of events out of the control of the players.

Similarly, U.S. Pat. No. 6,435,508 to Tavel describes a collectable card game having literary and mathematical learning components whereby some of the cards to be used during game play are selected randomly by the players. Victory is attained by depleting mathematically calculated "energy" from each of the opposing players.

Some specialized card games also involve the use of a gaming board and various other pieces. For example, U.S. Pat. No. 5,816,573 to Bolling combines elements of card and board gaming in which instructions printed on cards cause players to give and take a plurality of gaming pieces and tokens among each other until a player attains a specified number tokens. Playing cards are common to all of the game players and selected in the order in which they are stacked in a playing card supply area of the game board. U.S. Pat. No. 8,020,873 to Kuneman teaches a trading card game for two players featuring various graphics instructing each player to "attack" the other. A rolling die is used to progress play, and data values associated with each player increase or decrease depending on points listed on each card when played. The first player who has no more cards to play is considered to have lost the game.

Still, each of the above mentioned prior art involves some element of chance which decreases the amount of strategy to be used in exacting victory. None of those games in existence combine the characteristics of the present invention. Thus, there remains a need for a board game that may provide players with the opportunity to experience fully strategic game play by minimizing the effect of chance on a player's ultimate win or loss. There further remains a need for a game which further combines board gaming elements with various advantages of collectable and tradable elements.

SUMMARY

The present disclosure is directed to a game combining gaming elements such as a board and movable playing pieces with various selectable prompts that allow play to progresses according to strategy individually developed by each player. In some embodiments, the selectable prompts are stylized playing cards that are collectable over time and tradable with other players.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In an embodiment, the game comprises a playing field, a plurality of groups of game pieces, and a plurality of selectable prompts each providing instructions optionally invocable by a player in possession of a prompt to strategically progress game play.

The playing field, for example, may be defined by a game board having a flat upper surface. The flat upper surface of the game board may be further defined by laterally and longitudinally contiguous spaces, such as squares, sized to accommodate one each of the game pieces from the plurality of groups of the same. In some embodiments, the playing field may be represented electronically. Indeed, it is contemplated that any or all of the gaming elements discussed herein may take a physical tangible form, or even a virtual electronic form. Thus, it is to be understood that the following physical descriptions are offered by way of example only and not of limitation.

In some embodiments, the groups of game pieces may each bear visually different indicia from the pieces of each other group. For example, each group of pieces may be a different color from each other group of pieces. Thus distinguished from one another, each group of pieces may correspond to one player of the game. Still, it is contemplated that some may choose to play as pairs or teams of players. In such a case, each group of pieces may correspond to one pair or collaborative plurality of players. In the interest of simplicity, however, the term player, although grammatically singular, shall be used herein to refer to any individual or collaborative plurality, or team, of people corresponding to a single group of game pieces. As such, it is contemplated that a game with two players or teams may comprise two groups of game pieces bearing visually different indicia. Likewise, a game with three players or teams may comprise three groups of game pieces bearing visually different indicia, and a game with four players or teams may comprise four groups of game pieces bearing visually different indicia. Of course, one skilled in the art will recognize that the game and method of play are not limited to play between two to four players, pairs of players, or teams of players as the case may be. The foregoing is offered by way of example only and not of limitation.

The particular dimensions of the playing field, or, in other words, the number of spaces used during game play, may depend on the number of players participating in the game. For example, where the game is played by two players, the pieces may be arranged within a portion of the board, or zone, comprising an eight space by eight space portion of the board. As another example, where the game is played by three players, the pieces may be arranged within a zone comprising a nine space by nine space portion of the board. As yet another example, where the game is played by four players, the pieces may be arranged with a zone comprising a 12 space by 12 space portion of the board. Such dimensions are not strictly necessary to play the game however, it is contemplated that the number of spaces in each row and column defining the zone for the playing field may be any multiple of the number of players participating in the game. Sizing the playing field in this manner may ensure that each player begins the game with the same number of pieces on the board, ensuring that none is unfairly advantaged by for beginning game play with more or less pieces on the board than any other player.

Having selected a zone appropriately sized for the number of players in the game, each player may then be instructed to arrange his game pieces within the zone so that each piece is linearly separated from another in the same group by one piece each of any other player's corresponding group until each space within the zone is occupied by one game piece each. It is contemplated that the pattern created by initially arranging the pieces corresponding to the participating players in this manner avoids creating a chance-driven advantage toward winning the game. In other words, any advantage owing to a particular arrangement of the pieces on the game board is minimized. Each player may instead begin game play with an equal opportunity to win.

In some embodiments, the plurality of selectable prompts may be formed as playing cards with the optionally invocable instructions being printed thereon in words or diagrams relating to the instructions. The cards may even be stylized according to a particular theme. For example, in some embodiments, the cards may be stylized to depict a military theme. In other embodiments, the cards may be stylized to depict features from past eras such as Medieval era or the Renaissance. In still other embodiments, the cards may show human and/or animal characters and designs related to such characters. Although it is contemplated that a pool of cards may be initially provided with the board and game pieces, it is further contemplated that additional cards may be provided on their own to expand the initial pool over time. Indeed, being cohesively stylized, it is contemplated that some players may choose to collect and/or trade the cards among other players.

The pool of cards may be divided into sets bearing visually different indicia corresponding to the visually different indicia of the game pieces. In such a case, each player may play with a set of cards bearing the same indicia as that born by his set of game pieces. Each card within the set may have instructions printed thereon to match a card in each other set. Meanwhile, some of the cards or even each card within each set may have different instructions printed thereon from any other card within the same set so that the instructions optionally invocable by the player in possession of the set of cards are varied. Providing sets of cards in this manner may further avoid any initial chance-driven advantage that any player may have over another at the beginning of the game. Indeed, the outcome of the game may depend solely on any strategy developed as, over the course of the game, a player elects to invoke the instructions printed on their own set of cards in a particular order or in response to the instructions invoked by other players.

In some embodiments, this strategic element may be enhanced by providing each player with a set of cards and further instructing them each to build a deck of cards from within that deck. In such an embodiment, each player's deck may be unique from each other player's deck. Indeed, each deck may comprise cards each having different instructions than each other card in each other player's deck.

In some embodiments, players may choose to build their decks or sets of cards by placing therein cards separately acquired to expand the pool of cards.

In other embodiments still, is contemplated that a pool of cards remain common to all of the players jointly so that no player has his own set of cards.

Having placed their game pieces on the board and further having selected cards to form an initial hand, each player may then execute turns in sequence. Each turn may comprise one or more of the steps of: returning one or more prompts from the player's hand to their respective set or deck of cards; drawing one or more additional prompts from their respective set or deck of cards; offensively invoking the instructions on one or more game prompts in the player's hand; defensively invoking the instructions on one or more prompts in response to another player's defensive invocation of their own in-hand prompt; selecting a row or column on the game board; and moving any game pieces in the selected row. When players move a selected row along the game board, a game piece may be pushed out of the zone defining the playing field. When that happens, it is contemplated that the player who caused the piece to be moved out of bounds may collect the piece for their own bank of game pieces. Indeed, some prompts may require a player to discard a number of pieces from his bank, or pay, to invoke various instructions provided.

Of course, one skilled in the art will recognize that instructions on the game prompts may affect the number of game pieces moved out of bounds and even whether the moving player may keep the out of bounds piece or pieces for their own bank. More particularly, in some embodiments, the instructions on the prompts or cards may be any or a combination of those for: rearranging game pieces on the board, removing game pieces from the board to accumulate a bank of game pieces, discarding game pieces from said bank, responding to another player's invocation of a prompt, and redefining the sequence by which players execute their turns.

While executing their own turn in sequence, each player may further choose to discard one or more prompts from their hand, each player may invoke prompts from his own set against opposing players, causing pieces to be removed from the playing field until only one, bearing the visually different indicia identifying the winning player, remains. Indeed, it is contemplated that as each players' corresponding game pieces are wholly eliminated from the game board, such players may be deemed to have lost the game.

Additional gaming elements are also contemplated. For example, each bank of game supplements may be supplemented with prompts drawn or configured to represent game pieces or even currency. As another example, each player may have a gaming piece to visually indicate which row or column on the board they have selected to move. As yet another example, a means for moving all of the pieces within a selected row or column while maintaining any empty spaces between each piece may be provided.

In some embodiments, the level of difficulty of the game may be altered by instituting additional rules and/or limitations. For example, in one embodiment, the players may be instructed to complete specific tasks in addition to typical steps in completing a turn in sequence. For example, a common pool of prompts comprising task instructions may be provided. Such tasks may be, for example and without limitation, to remove a certain number of other players' game pieces from the playing field over the course of a single turn in sequence. Each player may select a task prompt and collect a reward such as additional game pieces for their own bank, or other advantage, upon completion of the task.

In other embodiments, whether a player may select a row or column to move may depend on whether doing so would push their own game piece out of the bounds of the zone comprising the playing field. In other words, a player may be prohibited from selecting a row that would cause them to push their own game piece out of bounds. Alternatively, a player may be required to select a row that would cause them to push their own game piece out of bounds. In some embodiments, each of the game pieces within each group of game pieces may be dressed to correspond with a prompt in the corresponding player's hand. When a game piece is pushed out of bounds of the zone comprising the playing field, the player identified by the different indicia of the game piece may be instructed to discard and be prohibited from invoking the instructions of any corresponding cards or prompts from his hand, set, or deck of cards or prompts.

Thus, is an object of the invention to minimize the effect of chance on ultimate outcomes in the game play in some embodiments.

It is another object of the invention to enhance strategic elements of the game by providing opportunity for customization by each individual player.

It is an object of the invention to optionally introduce chance-driven rules to the game.

It is yet another object of the invention to combine various advantages of board games and card games.

It is still another object of the invention to provide gaming elements that are optionally collectable and tradable by and among game players.

One or more of the above-disclosed embodiments, in addition to certain alternatives, are provided in further detail below with reference to the attached figures. The disclosed subject matter is not, however, limited to any particular embodiment disclosed.

BRIEF DESCRIPTION OF THE DRAWINGS

FIGS. 2A-C shows perspective and plan views of an embodiment of a game piece in accordance with one embodiment of the game.

FIG. 5-7 illustrate additional game elements in accordance with an embodiment of the game.

FIGS. 9A-B show one embodiment of game progression in accordance with one embodiment of the game.

FIGS. 10A-B show an alternative embodiment of game progression.

Figure 1:
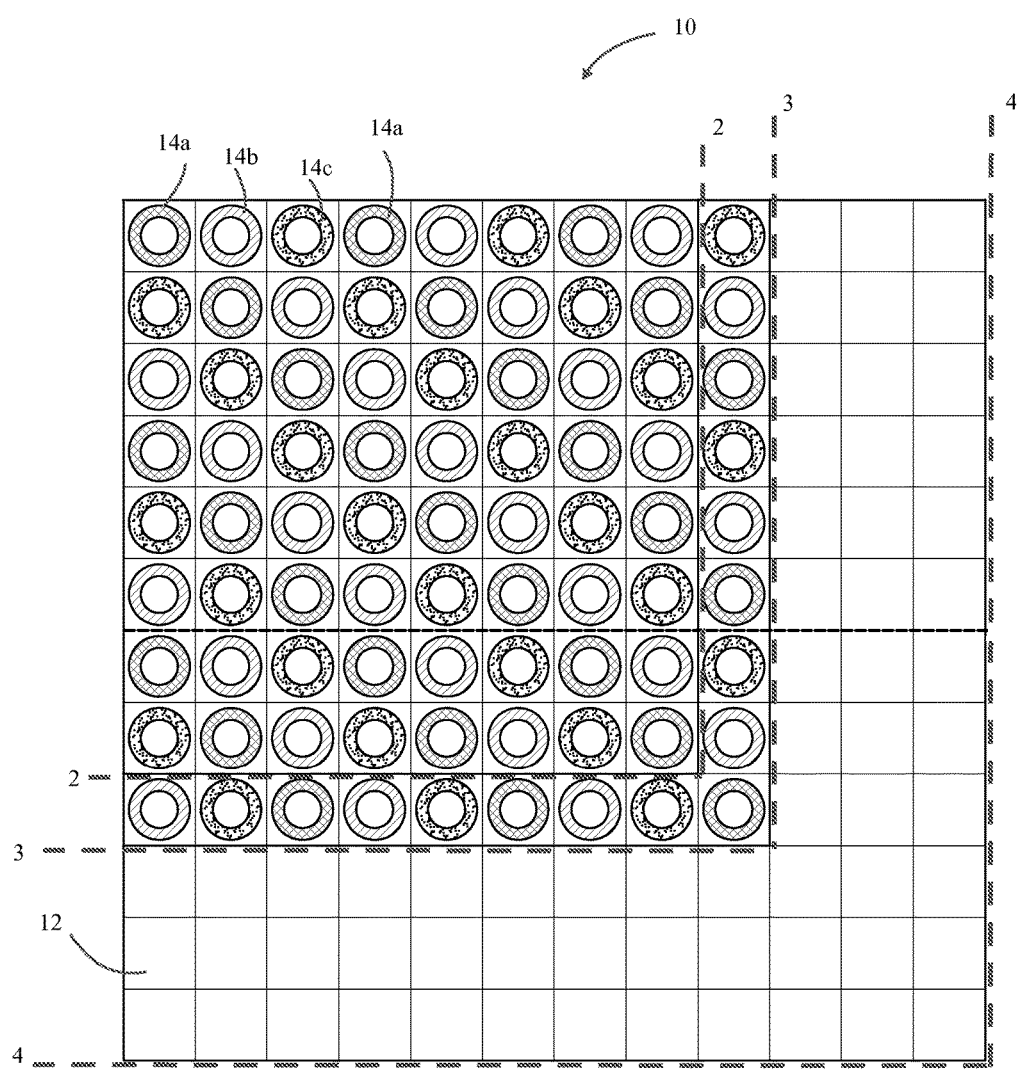
FIG. 1 shows an embodiment of a playing board with pieces respective to three players disposed thereon.

The disclosed embodiments may be better understood by referring to the figures in the attached drawings, as provided below. The attached figures are provided as non-limiting examples for providing an enabling description of the game and method of play claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

In an embodiment, the game comprises a playing field, a plurality of groups of game pieces, and a plurality of selectable prompts each providing instructions optionally invocable by a player in possession of a prompt to strategically progress game play. Some embodiments of the game are herein discussed with respect to tangible gaming elements adapted for use among players physically present in the same environment. For example, it is well known that many games are played by players in a social setting, wherein each player is present and plays in the vicinity of each other player around a table or other surface. However, it is contemplated that any or all of the gaming elements herein described may additionally or alternatively be embodied in an electronic or virtual space. Indeed, some embodiments may even enable players of the game to interact with one another from remote locations via their own respective, personal electronic devices.

With reference to FIG. 1 an embodiment of the playing filed may be defined by game board 10 having a flat upper surface. The flat upper surface of the game board 10 may be further defined by laterally and longitudinally contiguous spaces 12, such as squares, sized to accommodate one each of the game pieces 14a, 14b, 14c.

One skilled in the art will recognize that the game and method of play may be practiced with game pieces in various forms and embodiments, however an exemplary embodiment of a possible game piece is shown in FIGS. 2A-C. More particularly, in one embodiment, each piece 14 may be formed as a chip. Indeed, each piece 14 may be a hollow chip having an annular top portion 16 and a circular bottom portion 18. The top and bottom portions 16, 18 may be vertically separated from one another by a side portion 22 having a slot 24 disposed thereon to receive a flat disk 26 between the top and bottom portions 16, 18. When inserted through the slot 24 between the top and bottom portions 16, 18, a face 28 of the disk 26 may be viewable through the open center 32 of the annular top portion 16.

Returning to FIG. 1, each group of game pieces 14a, 14b, 14c may each bear visually different indicia. It may be seen that this feature is demonstrated in FIG. 1 with different hatched patterns. In some embodiments, the visually different indicia may be color. Thus, each group of pieces may be a different color from each other group of pieces. Distinguished from one another then, each group of pieces 14a, 14b, 14c may correspond to one player of the game. It should be noted, however, that it is contemplated that some players may choose to play the game as pairs or teams of players. In such a case, each group of pieces 14a, 14b, 14c may correspond to one pair or team of players. In the interest of simplicity, however, the term player, although grammatically singular, shall be used herein to refer to any individual or collaborative plurality of people comprising a team as a unit corresponding to a single group of game pieces 14a, 14b, 14c. For exemplary purposes, FIG. 1 shows three groups of game pieces 14a, 14b, 14c bearing visually different indicia, thus pictured is an embodiment of the game played between three players or three teams of players. It is contemplated that the game may be played with more or less than three players, though. For instance, a game with two players or two teams of players may comprise two groups of game pieces bearing visually different indicia, and a game with four players or four teams of players may comprise four groups of game pieces bearing visually different indicia. Of course, one skilled in the art will recognize that the game and method of play are not limited to play between two to four players, pairs of players, or collaborative teams as the case may be. The principles of game play may be applied to the same method of play as between fewer or lesser players. Thus, the foregoing is offered by way of example only and not of limitation.

It may be noted that only a portion of the board 10 in FIG. 1 is occupied by any game pieces 14a, 14b, 14c. It is contemplated that the particular dimensions of the playing field, or in other words, the number of spaces used during game play, may depend on the number of players participating in the game. For example, as noted before, FIG. 1 illustrates an exemplary game between three players. In such a game, the zone defining the playing field may comprise a nine space 12 by nine space 12 portion of the board 10, bordered by referential dotted lines 3. In a game between two players, the zone defining the playing field may comprise an eight space 12 by eight space 12 portion of the board 10, bordered by referential dotted lines 2. In a game between four players, the zone defining the playing field may comprise a twelve space 12 by twelve space 12 portion of the board 10, bordered by referential dotted lines 4. Such dimensions are not strictly necessary to practice the game or method of play. However, it is contemplated that the number of spaces 12 in each row and column within the zone defining the playing field may be a multiple of the number of players participating in the game. Sizing the playing field in this manner may ensure that each player begins the game with the same number of pieces on the board, further ensuring that none is unfairly advantaged by for beginning game play with more or less pieces 14a, 14b, 14c on the board than any other player.

Each space 12 may comprise an identifying number, letter or other symbol corresponding to each player or playing piece in order to aid initial set-up, however, whether or not such feature is included affects neither the game or method of play. It may simply aid players in initially placing their pieces. Moreover, the zones comprising portions 2 and 3 of the board 10 are shown to occupy the game board 10 from an upper left corner. It is contemplated however, that any portions comprising less than the entirety of the board may also be formed from the center of the board, or any other region. Thus placement of the zones should not be limited to that shown.

Having selected a zone appropriately sized for the number of players in the game, each player may then be instructed to arrange some of their game pieces within the zone. In an embodiment, each piece 14a, 14b, 14c may be linearly separated from another in the same group by one piece each of any other player's corresponding group until each space within the zone is occupied by one game piece each. Thus, with reference to the three-player embodiment shown in FIG. 1, it may be seen than piece 14a is linearly separated, both in the horizontal and vertical directions, from another piece 14a by one each of pieces 14b and 14c. One skilled in the art will recognize that a single different piece may separate like pieces in games between two players. Likewise, three different pieces may separate like pieces in games between four players. It is contemplated that the pattern created by initially arranging the pieces corresponding to the participating players in this manner avoids creating a chance-driven advantage toward winning the game. In other words, any advantage owing to a particular arrangement of the pieces on the game board is minimized. Each player may instead begin game play with an equal opportunity to win because each has the same number of pieces arranged in a similar manner around the board. One skilled in the art will recognize that other arrangements of the pieces on the board, thus the foregoing is offered by way of example only and not of limitation. Indeed, it is even contemplated that players may take turns placing one or more pieces on the playing field within the space of their choosing. Such a rule may add an additional strategic element to game play.

The game also comprises a plurality of selectable prompts each providing instructions that are optionally invokable, offensively or defensively, by players against one another during the course of game play. Although the prompts may take many different forms, to practice the game and method of play, various embodiments of the prompts are shown as playing cards in FIGS. 3A-C for the sake of simplicity and enabling the disclosure.

Figure 3A:
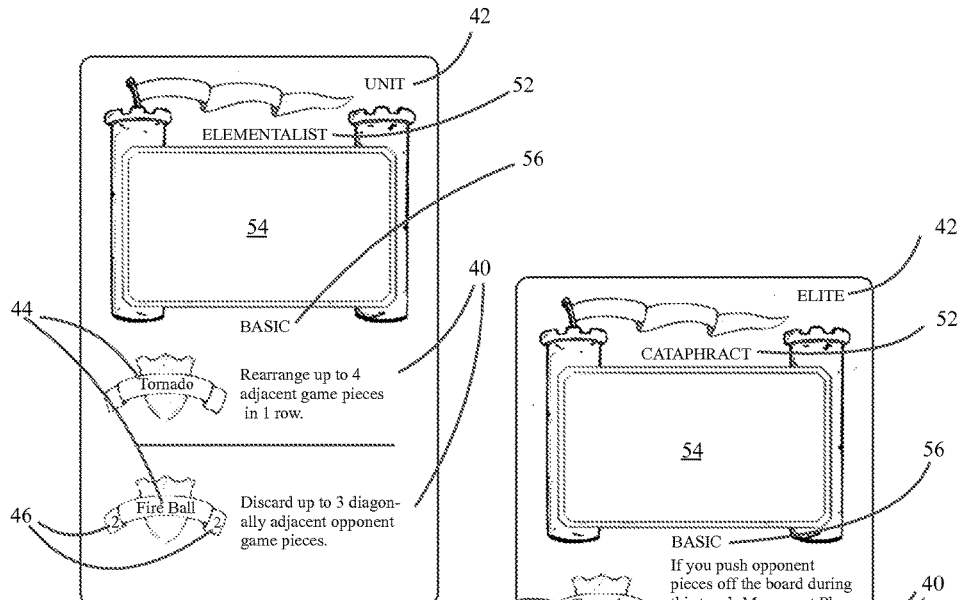
FIGS. 3A-C show various embodiments of prompts in accordance with one embodiment of the game.
Figure 3B:
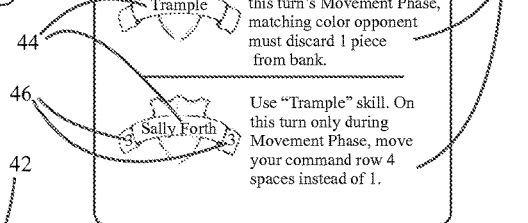
Figure 3C:
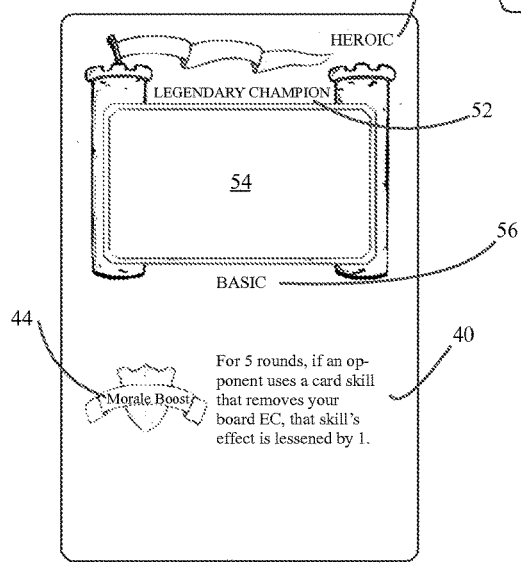

In such embodiments, the optionally invocable instructions 40 may be printed the cards in words, pictures, and/or diagrams to communicate the instructions available for the players to invoke against one another. In the various embodiments pictured, optionally invocable instructions 40 are provided in written form as blocks of text. It is contemplated, however, that the various gaming elements disclosed may be provided in electronic form. As such, one skilled in the art will recognize that in electronic embodiments of the game, for example, such prompts may be embodied as audio, video, or other communicated instructions. In any form, it is contemplated that each prompt be configured to communicate instructions relating to any or a combination of: rearranging game pieces on the board; removing game pieces from the game board to accumulate a bank of game pieces; discarding game pieces from said bank; responding to another player's invocation of a defensive prompt; and redefining the sequence by which players execute turns. For example, a player in possession of the prompt in FIG. 3A may optionally "[r]earrange up to 4 adjacent game pieces in 1 row," which comprises instructions for rearranging game pieces on the board. FIG. 3A also provides optionally invocable instructions 40 to "[d]iscard up to 3 diagonally adjacent opponent game pieces" from the board, comprising instructions for removing game pieces from the board. It may be seen in FIGS. 3B and 3C provide optionally invocable instructions 40 for progressing game play that are different both from those in FIG. 3A and from each other.

Each card within the set may have instructions printed thereon to match a card in each other set. Meanwhile, some of the cards or even each card within each set may have different instructions printed thereon from any other card within the same set so that the instructions optionally invocable by the player in possession of the set of prompts or cards are varied. Restricting prompts or cards in this manner may further avoid any initial chance-driven advantage that any player may have over another at the beginning of the game. Indeed, the outcome of the game may depend solely on any strategy developed as, over the course of the game, a player elects to invoke the instructions printed on their own set of cards in a particular order or in response to the instructions invoked by other players.

In some embodiments, the prompts or cards may each comprise further identifying information. For example, FIGS. 3A-C are variously labeled with a rank 42, a description 44 characterizing the instructions, and a cost 46 associated with invoking any of the instructions thereon. Of course, one skilled in the art will recognize that the particular arrangement of such information about the card or prompt may vary. The foregoing is provided simply as one example of many possible embodiments. Indeed, it is contemplated that some cards or prompts may even be In some embodiments, the prompts may be stylized according to a particular theme. For example, it may be seen with reference to the figures that the cards may be stylized to depict features from past eras such as Medieval era. More particularly, the cards illustrated in FIGS. 3A-C feature castles, shields, and banners evoking real or imaginary feudalism and military conquest. Indeed, in some embodiments, the prompts or cards may feature a name 52 that further characterizes the instructions 40 available to invoke. The prompts or cards may additionally feature space for additional imagery 54 associated with any such characterizations. For example, in keeping with a fantasy and/or Medieval theme, the card in FIG. 3A names 52 an "Elementalist," and associates such a character with instructions 40 described 44 as "Tornado" and "Fire Ball," which evoke nature-based magical powers. FIG. 3B, names 52 a "Cataphract," and associates such a character with instructions 40 described 44 as "Trample" and "Sally Forth," which evoke some of the activities associated with ye olde armored cavalry-men. Likewise, FIG. 3C, names 52 a "Legendary Champion," and associates such a character with instructions 40 described 44 as "Morale Boost," which evokes awe and encouragement found with reference to heroes and other great military figures.

The cost 46 may be the number of game pieces a player must discard from their own bank of pieces collected from the game board in order to invoke the instructions 40 provided on each card. In such an embodiment, game pieces taken from the game board according to the various rules and invoked instructions may serve as currency. It should be noted that FIGS. 3A and 3B show two separate instructions each 40, described above, while FIG. 3C shows only one instruction available to invoke. Players may be instructed to elect to invoke one instruction 40 or the other before being compelled to discard the card from their hand. Players may alternatively be instructed to invoke both instructions 40.

It should also be noted that some instructions 40 may cost 46 a player while others do not. For example, in FIG. 3A, the instruction 40 described 44 as "Tornado" does not include any cost, while the instruction 40 described 44 as "Fire Ball" costs 46 two game pieces. In FIG. 3B, the instruction 40 described 44 as "Trample" does not include any cost, while the instruction 40 described 44 as "Sally Forth" costs 46 three game pieces.

Although illustrated with castles, shields, and banners and additionally characterized in keeping with a fantastic Medieval-inspired theme, the cards or prompts may be styled according to many other themes. For example, in some embodiments, the cards may be stylized to depict a military theme from any age or culture. In still other embodiments, the cards may show human and/or animal characters and designs related to such characters. Further, although it is contemplated that a pool of cards may be initially provided with the board and game pieces, it is further contemplated that additional cards may be provided on their own to expand the initial pool over time. Indeed, being cohesively stylized, it is contemplated that some players may choose to collect and/or trade the cards among other players.

In an embodiment, a pool of prompts or cards common to all players of the game may be provided. In other embodiments, players may collect their own set of cards or prompts over time. In some embodiments, a plurality of sets of prompts or cards bearing different indicia from one another may be provided. For example, the different indicia may be background colors. Indeed, in such a case it is contemplated that each indicia may correspond to one each of the different indicia on the game pieces. Thus, in some embodiments, each player may proceed through game play in possession of a set of cards having indicia matching the indicia of their game pieces.

In one embodiment, each player may be instructed to build a deck of prompts or cards comprising some of those in a common pool, a collected pool, a set bearing different indicia from other sets, or a combination of the same as the case may be. Each player may be instructed to select up to 25, up to 30, up to 40, or even up to 50 cards from their respective pool and/or set to form the deck with which they will play for the duration of the game.

In some embodiments, additional rules may be imposed on players regarding the selection of prompts or cards to comprise the set that each plays with. For example, in some embodiments, players may be instructed to limit the number of various types or ranks 42 of cards contained in their own deck. In the figures, "Unit," "Elite," and "Heroic" ranks 42 are indicated, and may be provided as a method of broadly characterizing the benefit provided by the optionally invokable instructions on the cards. Then as an example, where types of prompts are classified as one of a unit, elite, or heroic type, each player may be instructed to construct a deck limiting the number of each of any types of rank of prompts or cards they choose for their respective decks. As an example in practice, where the maximum number of prompts or cards each player is instructed to select for their respective decks is 50, each player may be instructed to choose no more than about 25 unit cards, no more than about 22 support cards, no more than about two elite cards, and no more than about one heroic card. Of course one skilled in the art will recognize that the foregoing limitations may be changed without meaningfully altering the game or method of play. Indeed, it is contemplated that the game may be player with more or prompts or cards forming each deck, with more or less types of prompts or cards, and even with ranks of different quality and quantities than those described. Thus the foregoing is offered by way of example only and not of limitation.

Having constructed a deck to play the game with, each player may then be instructed to select a limited number of prompts or cards from their respective decks to form an initial hand. As in forming their respective decks, the number of prompts or cards that each player is instructed to select for their initial hands may vary. In some embodiments, players may be instructed to choose up to 10 prompts or cards. In other embodiments, players may be instructed to choose between five and 10 prompts or cards.

It is contemplated, though, that providing each player with the freedom to build their own decks and hands, including providing individual control over the number allowed in each, from a pool, set, and/or collection of prompts or cards may enhance the effect that individual strategy may have over any ultimate outcomes in the game. In some embodiments, the effect of strategy may be even further enhanced by permitting each player to examine the optionally invocable instructions provided on each card in their respective decks in order to determine which cards to select for their respective initial hands. In other embodiments, an element of chance may be added to the game by instructing each player to blindly select a number of prompts or cards from their respective decks so that their initial hands are effectively randomized. In other embodiments still, is contemplated that a pool of cards remain common to all of the players jointly so that no player has their own set of cards, and all prompts or cards are selected randomly.

Having finally set up the game elements for play, including, for example, the board, game pieces, and individual decks and hands of prompts or cards, each player may execute a turn in sequence. More particularly, each player may take turns optionally invoking the instructions provided by the prompts or cards they have selected against one another and removing game pieces from the board according to such instructions until a single piece remains. The indicia of the remaining piece may correspond to the winning player.

Figure 4:
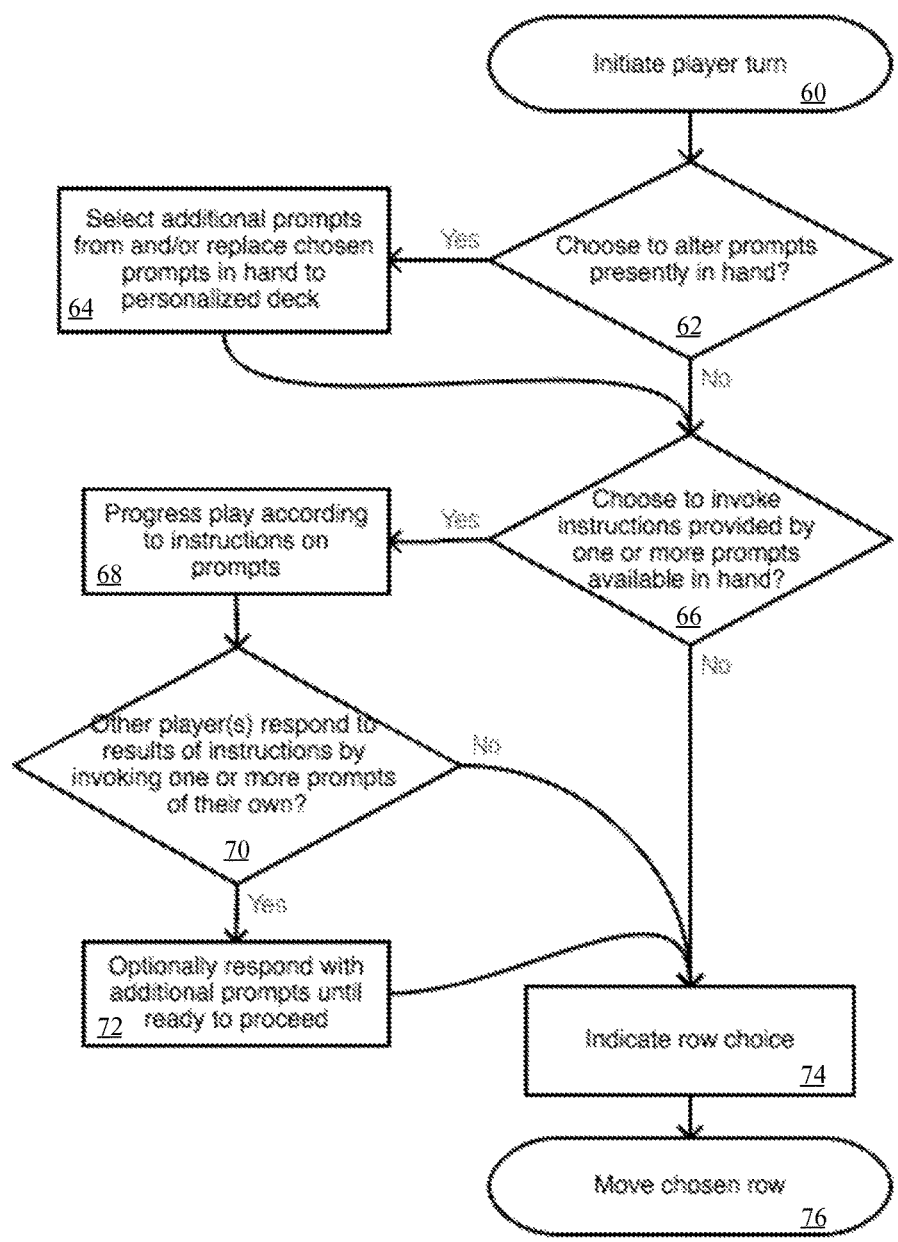
FIG. 4 is a flowchart illustrating a possible form of game play/method in accordance with one embodiment of a method for playing the game.

With reference to FIG. 4, each turn may comprise various steps optionally or mandatorily completed in sequence. For example, upon initiating a player turn 60, a player a player or team of players may determine whether they would like to alter the assortment of prompts or cards in their hand 62. The determination to change one or more of the prompts in hand may be made based on strategic judgment call made by the player. For example, the optionally invocable instructions in hand may seem not particularly advantageous for removing other player's or players' pieces from the board. In such a case, the player may choose to replace one or more prompts in-hand to their deck and/or replace some or all of the prompts in their hand to their deck 64. Of course, one skilled in the art will recognize that any decision to select additional prompts or replace of any in hand to the player's personalized deck may be made in light of any rules recognized to limit the number of cards or prompts permitted to be in hand. For example, if players are restricted to keeping no more than seven cards in-hand, then the player may not select additional prompts from their deck which would cause their hand to increase to eight or more cards. Moreover, additional rules may be instituted to limit the number of prompts or cards that a player be replace to and/or select from their deck.

Whether a player chooses to alter the prompts or cards presently in their hand 62 or not, the player may then be faced with the option to invoke any of the instructions provided by any of the prompts in hand 66.

Timing and other use restrictions are contemplated. For example, some of the instructions provided by the prompts or cards may be offensive in nature and limited to use during one's turn. For example, such cards may be invoked during step 66 illustrated in the flowchart. Others may provide instructions that are defensive in nature. In other words, they may be invoked in response to those invoked against a player, such as illustrated in step 70 illustrated in the flowchart. Others still may be neutral, and their use may be permitted at any point during the game. With reference again to FIGS. 3A-C, such use restrictions 56 may be printed on cards in an embodiment. For example, the cards shown include "Basic" use restrictions 56. This may mean that a player in possession of such cards is permitted to invoke the instructions in an offensive manner when they play their turn in sequence. Other instructions may be restricted to offensive use during their turn, defensive use in response to another player's invocation, or even anytime use allowing a player to invoke an instruction printed thereon out of their turn in sequence.

It is contemplated that one or more of any of the phases may be deemed mandatory or optional. For example, whether or not a player chooses to alter any prompts or cards in hand 62, whether a player invokes instructions on any prompts or cards 66, or whether any players invoke cards or prompts having defensive instructions 70 may be optional and determined by each player individually according to their own game playing strategy. Other phases such as selecting and moving a row of pieces 74, 76 on the board may be mandatory for each player at the end of their turn in sequence.

Thus, more generally, the optional or mandatory steps comprising a turn in sequence may be chosen from: discarding one or more prompts from the player's hand, drawing one or more additional prompts from the player's deck, offensively invoking one or more prompts in the player's hand, defensively invoking one or more prompts in response to another player's defensive invocation of their own in-hand prompt or prompts, selecting a row or column along the board game, and moving any game pieces in the selected row or column.

Additional gaming elements may be provided for use during game play. For example, FIGS. 5-7 illustrate game cards with information other than optionally invocable instructions for progressing game play. FIG. 5, for instance illustrates a "Quest" 43 card, characterizing a task 45 as an "Offensive Strike" 47. Players who achieve the task 45 described may be granted a reward 49 providing some advantage toward eliminating opponent pieces from the game board. Other tasks 45 than that depicted may be provided, and their method of inclusion may vary. For example, a common pool of prompts comprising task instructions may be provided. Each player may select a task prompt and collect a reward such as additional game pieces for their own bank, or other advantage, upon completion of the task in addition to typical steps in completing a turn in sequence. It is contemplated that optionally incorporating such an element in game play may alter the difficulty of the game by adding additional obstacles and opportunities to form and exercise discretionary strategy.

In some embodiments, additional rules may be incorporated to alter the level of difficulty of the game. For example, referring to FIG. 2A, the face 28 of the disk 26 viewable through the open center 32 of the annular top portion 16 of each game piece 14 may depict an image or word associated with the rank of each card. Players may be instructed that when a piece 14 bearing their corresponding different indicia is removed from the board, a card or prompt having the same rank as that shown on the face 28 of the disk 26 viewable through the open center 32 of the top portion 16 of the piece removed must also be removed from the player's hand or deck of prompts or cards. In other words, rules handicapping players are contemplated.

FIG. 6 shows a "Command," card which may be used to more clearly indicate the row or column according to step 74 in FIG. 4. Such a card may be placed in line with a selected row or column so that other players are alerted to the choice, and, in some embodiments are prevented from selected the same row upon execution of their own turn in sequence. In some embodiments, players may be prohibited from selecting a different row or column, or otherwise changing their mind as to their indication until time comes to execute their next turn in sequence. In such embodiments, a "Command" card may aid enforcement of related rules.

FIG. 7 shows an embodiment of currency as a card. This may be used in addition to the game pieces collected in various players' individual banks and similarly discarded to pay the cost associated with invoking various instructions to progress game play. In some embodiments, the number of currency, or "Experience Coin" cards held by a player may be included in the count comprising the player's initial hand. In other embodiments, such cards may be earned over the course of game play. In other embodiments still, such cards are wholly eliminated from play.

Cards such as those depicted in FIGS. 5-7 may be stylized to complement any prompts or cards otherwise provided. As such, images 58 may be provided to relate directly to the character or purpose of the card. For example, with reference to FIG. 5, a picture illustrating a specific task may be provided. As another example, and with reference to FIG. 6 an arrow or other directional image may be provided in space 58 so that a player's row or column choice is more clearly depicted. As still another example, and with reference to FIG. 7, a game piece or even currency may be drawn in space 58 to illustrate the intended purpose of the card.

Figure 8:
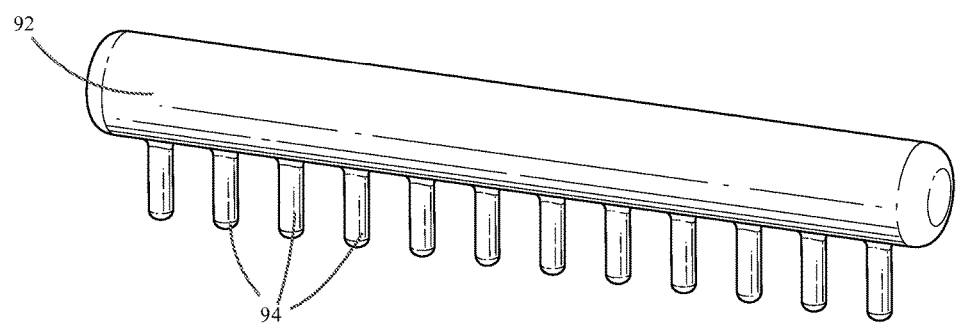
FIG. 8 shows an embodiment of an additional gaming implement for moving game pieces across the board in accordance with one embodiment of the game.

FIG. 8 illustrates an embodiment of a means for moving the game pieces along the board during execution of step 76 shown in FIG. 4. Such means for moving the game pieces may also be used where warranted by instructions invoked by the players during game play as well. Returning to FIG. 8, in some embodiments, the means for moving the game pieces comprises an elongate member 92 spanning about the length of the game board and having a plurality of members 94 extending downward therefrom. It should be noted that FIG. 9A shows a portion of the board 10 from FIG. 1 with pieces 14a, 14b, 14c disposed thereon in a three player game so that use of the means for moving 90 the game pieces 14a, 14b, 14c may be more clearly demonstrated. In the interest of simplicity, only the top three rows of the 12-column board 10 are shown and are bordered by referential dotted line 3, although it is to be understood that a full game board 10 may be 12 spaces by 12 spaces in dimension and further include all of the aforementioned zones. Still, the means for moving 90 the pieces 14a, 14b, 14c may be formed so as to be used to move any game pieces across a playing field comprising any of the zones previously described or any others contemplated.

In one embodiment, the plurality of members 94 may be pegs sized to mate with the open centers 32 of the annular top portions 16 of the game pieces 14a, 14b, 14c, as shown in FIG. 9A. A player may then apply force along the plane of the game board 10 to move all of the pieces 14a, 14b, 14c within the row or column in a line. Players may be instructed to move all of the pieces by a single space, or by a plurality of spaces. In some embodiments, players may be prevented from executing step 76 in FIG. 4 of moving a chosen row or column by instructions invoked by other players. As shown in FIG. 9B, moving a selected row may cause a piece, such as 14c to be pushed outside of the zone defining the playing field. Such a piece may be collected by the moving player and added to their bank of game pieces and further used to pay to invoke instructions provided by the prompts or cards in his hand or set of prompts or cards.

Where spaces 12a and 12b exist on the board between pieces such as pieces 14a and 14b as shown in FIG. 10A, players may be instructed to move only a portion of the board when completing the moving step of their turn in sequence. Thus for example, pieces may be moved to cover space 12b as shown in FIG. 10B while leaving space 12a exposed. In such a case, it is possible that no pieces are pushed outside of the zone defining the playing field. Although horizontal and leftward pushing is depicted, it is contemplated that each player may indicate a row or column from any side of the zone defining the playing field.

Figure 11:
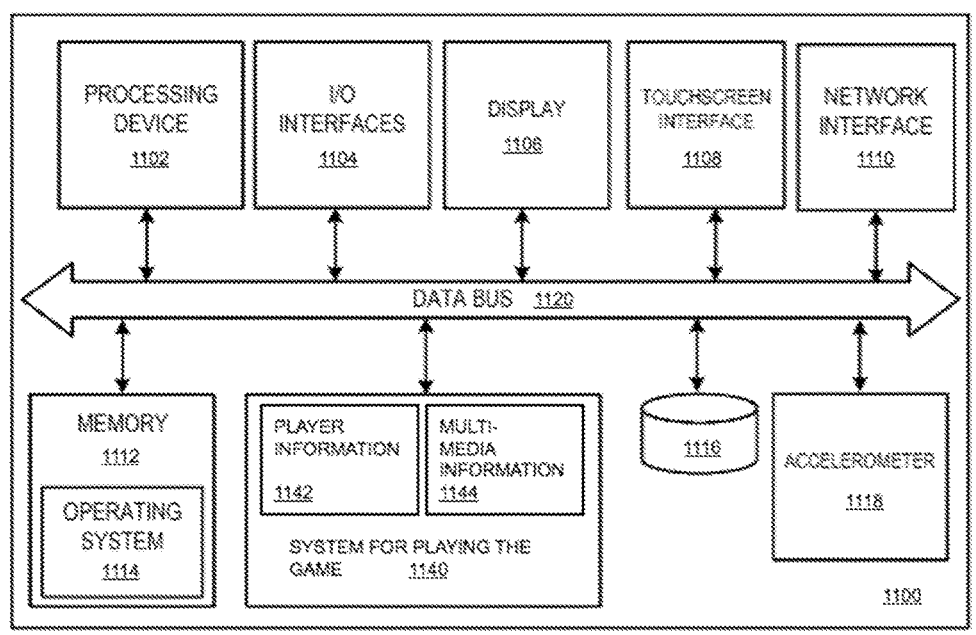
FIG. 11 illustrates one embodiment of an electronic device configured to implement the game.

Electronic embodiments of the game are also contemplated. FIG. 11 illustrates an exemplary electronic device 1100 configured to implement the game. Electronic device 1100 may be a tablet computer or smartphone but may also be embodied in any one of a wide variety of wired and/or wireless computing devices such as desktop, laptop, or even tablet computers. The electronic device 1100 may include a processing device (processor) 1102, input/output interfaces 1104, a display 1104, a touchscreen interface 1108, a network interface 1110, a memory 1112, and operating system 1114, a mass storage 1116 and an GPS 1118, with each communicating across a local data bus 1120. Additionally, electronic device 1100 may incorporate a system 1140 for playing the game, player information 1142 and multimedia information 1144, although the location of information 1142 and 1144 could vary.

The processing device 1102 may include any custom made or commercially available processor, a central processing unit (CPU) or an auxiliary processor among several processors associated with the electronic device 1100, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 1112 can include any one of a combination of volatile memory elements (e.g., random-access memory (RAM, such as DRAM, and SRAM, etc.)) and nonvolatile memory elements. The memory typically comprises native operating system 1114, one or more native applications, emulation systems, or emulated applications for any of a variety of operating systems and/or emulated hardware platforms, emulated operating systems, etc. For example, the applications may include application specific software which may comprise some or all the components of the electronic device 1100. In accordance with such embodiments, the components are stored in memory and executed by the processing device. Note that although depicted separately, the system 1140 may be resident in memory such as memory 1112.

Where the electronic device 1100 is embodied as a smartphone or tablet computer, touchscreen interface 1108 is configured to detect contact within the display area of the display 1106 and provides such functionality as on-screen buttons, menus, keyboards, etc. that allows users to navigate user interfaces by touch. For some embodiments, the electronic device 1100 will comprise GPS 2018 or other means to determine the location of the mobile device 1100.

Figure 12:
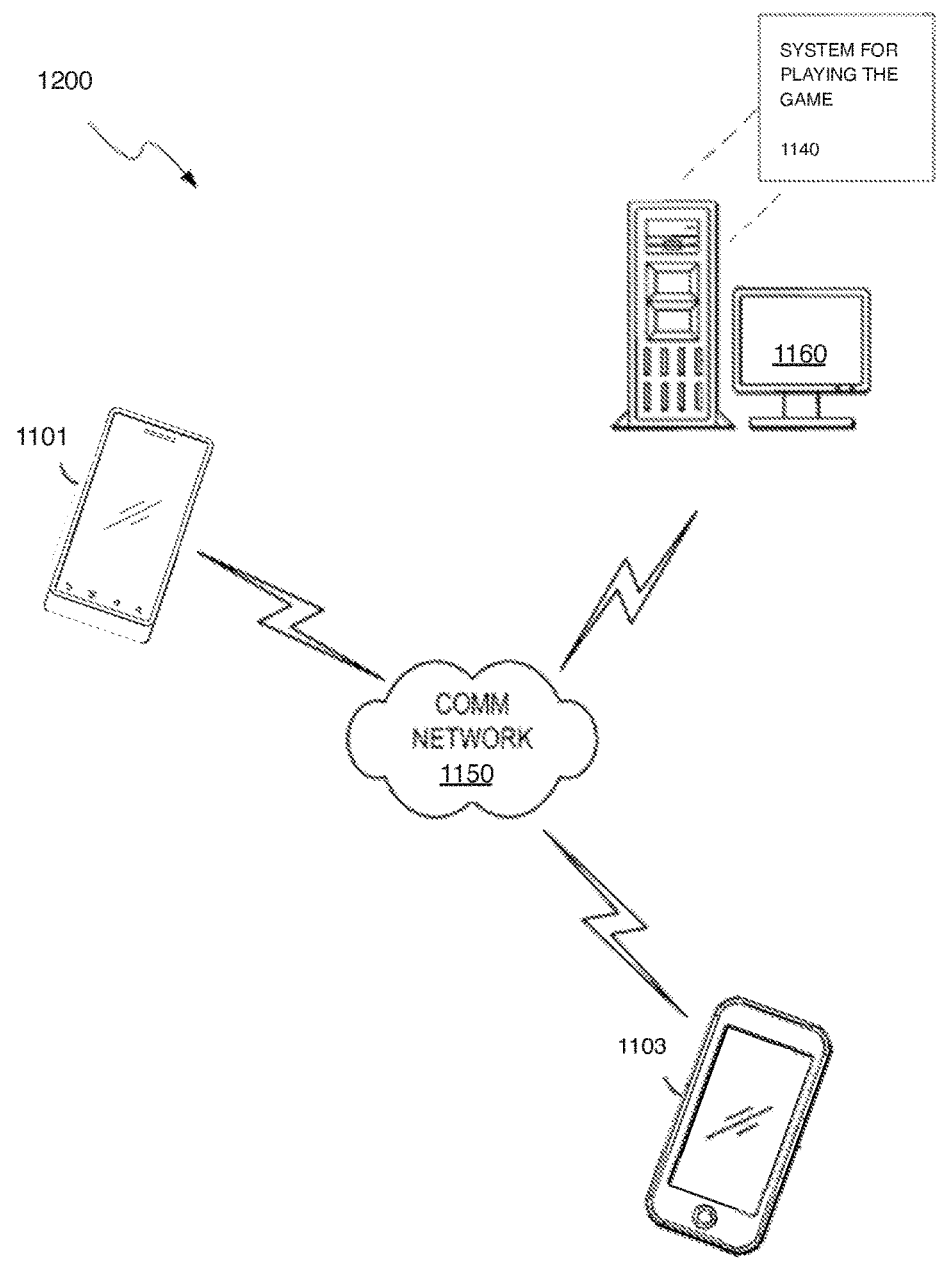
FIG. 12 shows a block diagram of a networked environment in which an embodiment of the system for playing the game is implemented.

One of ordinary skill in the art will appreciate that the memory 1114 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 11, network interface device 1110 comprises various components used to transmit and/or receive data over a networked environment such as depicted in FIG. 12. When such components are embodied as an application, the one or more components may be stored on a non-transitory computer-readable medium and executed by the processing device.

FIG. 12 is illustrative of a networked environment 1200 in which an embodiment of a system for playing the game 1140 is implemented. As shown in FIG. 12, system 1140 comprises a plurality of personal electronic devices. By way of example, and not limitation, two mobile electronic devices 1101 and 1103 are shown communicatively coupled via a communication network 1150. Each of the mobile devices may be embodied as a mobile computing device such as, for example and without limitation, a smartphone that incorporates cellular telephone functionality. Notably, the communications network can use one or more of various communications types such as, for example and without limitation, cellular and Wi-Fi communications.

Users of mobile devices 1101 and 1103 may use their devices to become members of a social network that enables them to interact with each other using their mobile devices 1101 and 1103 and exchange information pertinent to the game. In this exemplary embodiment, the social network may be facilitated by a website that is hosted by social network server 1160. As such, server 1160 facilitates interaction among a limited group of members, or players of the game, as may be established by the players themselves. For the purpose of the example presented in FIG. 12, the players are the users of mobile devices 1101 and 1103.

Additionally, server 1160 implements the system for playing the game 1140 and facilitates sharing information related to the game amongst players in the social network. Specifically, the server 1160 implements the steps outlined in FIG. 4. Accordingly, a player in the social network can access the server 1160 using their mobile devices 1101 and 1103 and can obtain information regarding other players and information relating to the games played between them.

In order to facilitate the aforementioned functionality, various aspects may be performed by one or more of the mobile devices 1101 and 1103. In one embodiment, the mobile devices are operative to perform, at least in part, the method depicted in the flowchart of FIG. 4 and described above. With respect to operation of system for playing the game 1140, the system 1140 is also operative to perform, at least in part, the method depicted in the flowchart of FIG. 4.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the electronic device 1100. The machine code may be converted from the source code, etc. If embodied in hardware, each block may represent a circuit or a number of interconnected circuits to implement the specified logical function(s).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, players may be instructed to play so that their prompts or cards are exposed to each other player and so that each other player may go forward in game play aware of the various instructions each other player has available to invoke. Players may alternatively be instructed to play so that their prompts or cards are kept secret from each other player. The number of prompts or cards permitted in a player's hand set may be altered. Rules limiting the rows and/or columns selectable may be instituted. For example, players may be prohibited from moving any row or column that would cause their own respective game piece from being pushed out of the bounds of the zone defining the field of play. Alternatively, players may be prohibited from moving any row or column that would cause another player's respective game piece from being pushed out of the bounds of the zone defining the field of play. Whether or not prompts or cards bearing identical invocable instructions may be permitted in hand or in a deck or set may be decided by the players or other rules. And whether or not players may be permitted to build sets or decks of prompts or cards from expanded pools of such prompts or cards may likewise be determined by the players or other rules. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the strategic game having collectable and tradable elements with which that terminology is associated. In general, the terms used in the following claims should not be constructed to limit the strategic game having collectable and tradable elements to the specific embodiments disclosed in the specification unless the above description section explicitly define such terms. Accordingly, the actual scope encompasses not only the disclosed embodiments, but also all equivalent ways of practicing or implementing the disclosed game and method of play. The above description of embodiments of the strategic game having collectable and tradable elements is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the game and method of play are contemplated in any number of claim forms. Thus, the inventor reserves the right to add additional claims after filing the application to pursue such additional claim forms for other aspects of the strategic game having collectable and tradable elements.

What is claimed is:

1. A method of playing games involving 2 or more players, comprising:
   providing a game board having a flat upper surface defined by laterally and longitudinally contiguous spaces, the game board having at least two differently sized zones, each zone comprising a portion of the game board and defining a plurality of playing fields, the use of such playing field determined by the number of players;
   providing a plurality of groups of game pieces, each group of pieces bearing visually different indicia from the pieces of each other group, each group further corresponding to one player each;
   providing a plurality of selectable prompts comprising optionally invokable instructions for progressing game play;
   instructing the players to place their respective game pieces on the game board within a zone so that each space within the zone chosen to define the playing field is occupied by one game piece each, and so that each game piece is linearly separated from another in the same player's group by one piece each from every other player's or players' group;

instructing each player to obtain an initial hand of prompts, wherein instructing each player to obtain an initial hand of prompts comprises:

instructing each player to construct their own personalized set of a predetermined number of prompts by selecting prompts from a pool of said prompts; and instructing each player to select a predetermined number of prompts from their personalized set of prompts; and instructing each player to execute turns in sequence with the other players, wherein each player's turn comprises one or more of the steps of:
  a) discarding one or more prompts from the player's hand,
  b) drawing one or more additional prompts,
  c) offensively invoking one or more prompts in the player's hand,
  d) defensively invoking one or more prompts in response to another player's defensive invocation of their own in-hand prompt or prompts,
  e) selecting a row or column along the board game, and
  f) moving any game pieces in the selected row or column.

2. The method of claim 1, wherein instructing each player to obtain an initial hand of prompts comprises instructing each player to blindly draw a predetermined number of prompts from a set of said prompts common to all players.

3. The method of claim 1, wherein moving any game pieces in a chosen row or column is restricted to longitudinal or lateral movement.

4. The method of claim 1, wherein each prompt for progressing game play comprises one or more of instructions for:
  rearranging game pieces on the board;
  removing game pieces from the game board to accumulate a bank of game pieces;
  discarding game pieces from said bank;
  defining oneself from the effect of another player's invocation of an offensive prompt; and
  redefining the sequence by which players execute turns.

5. The method of claim 1, wherein the number of spaces contained zone comprising the playing field is a multiple of the number of players participating in the game.

6. The method of claim 5, wherein
  at least one of the zones comprises an eight space by eight space portion of the game board and defines the playing field for two players;
  at least one of the zones comprises a nine space by 9 space portion of the game board and defines the playing field for three players; and
  at least one of the zones comprises a 12 space by 12 space portion of the game board and defines the field for four players.

* * * * *